US008439429B2

(12) United States Patent
Shida et al.

(10) Patent No.: US 8,439,429 B2
(45) Date of Patent: May 14, 2013

(54) COUPLING STRUCTURE BETWEEN FRONT PILLAR AND SIDE SILL OF AUTOMOBILE

(71) Applicants: Unipres Corporation, Kanagawa (JP); Nippon Steel & Sumitomo Metal Corporation, Tokyo (JP)

(72) Inventors: Masato Shida, Kanagawa (JP); Isao Satsukawa, Shizuoka (JP); Kouji Chiba, Kanagawa (JP); Syu Hashimoto, Kanagawa (JP); Takeo Kusunoki, Kanagawa (JP); Kenta Konishi, Kanagawa (JP); Masaki Itoga, Kanagawa (JP); Takashi Ariga, Tokyo (JP); Noriyuki Suzuki, Tokyo (JP); Toshiyuki Niwa, Tokyo (JP)

(73) Assignees: Unipres Corporation, Kanagawa (JP); Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/631,074

(22) Filed: Sep. 28, 2012

(65) Prior Publication Data

US 2013/0020836 A1    Jan. 24, 2013

Related U.S. Application Data

(63) Continuation of application No. PCT/JP2011/001551, filed on Mar. 16, 2011.

(30) Foreign Application Priority Data

Mar. 30, 2010    (JP) .................................. 2010-079797

(51) Int. Cl.
*B60N 99/00*    (2006.01)

(52) U.S. Cl.
USPC .................................. 296/193.06; 296/187.12

(58) Field of Classification Search ............. 296/193.05, 296/193.06, 187.12, 203.03
See application file for complete search history.

(56) References Cited

U.S. PATENT DOCUMENTS

| 4,669,776 | A  | * | 6/1987 | Harasaki ................. 296/203.02 |
| 6,053,564 | A  | * | 4/2000 | Kamata et al. ........... 296/187.09 |
| 2001/0020797 | A1 | * | 9/2001 | Saeki ....................... 296/203.03 |
| 2002/0043821 | A1 | * | 4/2002 | Takashina et al. ....... 296/203.03 |
| 2002/0190544 | A1 | * | 12/2002 | Yamamoto et al. ........... 296/205 |
| 2009/0096253 | A1 | * | 4/2009 | Yatsuda ................... 296/193.09 |

FOREIGN PATENT DOCUMENTS

| JP | 57-041578 | U |   | 3/1982 |
| JP | 05-069753 | A |   | 3/1993 |
| JP | 07089450  | A | * | 4/1995 |
| JP | 07-309256 | A |   | 11/1995 |

(Continued)

*Primary Examiner* — Lori Lyjak
(74) *Attorney, Agent, or Firm* — Jean C. Edwards, Esq.; Edwards Neils PLLC (57) ABSTRACT

Provided is a coupling structure between a front pillar and a side sill of an automobile, which improves the steering stability of the automobile and realizes a high productivity. A reinforcing member 8 is provided inside a front pillar 1 having a closed cross-section so as to extend in the front-rear direction of the automobile. The reinforcing member 8 is coupled to a front pillar outer 2. An end portion of the reinforcing member 8 at the rear side of the automobile is extended toward a side sill 4 to form a reinforcing member extension 8a. The reinforcing member extension 8a is coupled to a side sill outer 5.

8 Claims, 11 Drawing Sheets

FOREIGN PATENT DOCUMENTS

| | | |
|---|---|---|
| JP | 10-194155 A | 7/1998 |
| JP | 2000-238666 A | 9/2000 |
| JP | 2008-222039 A | 9/2008 |
| JP | 2009-061991 A | 3/2009 |

* cited by examiner

COUPLING STRUCTURE BETWEEN FRONT PILLAR AND SIDE SILL OF AUTOMOBILE

CROSS-REFERENCE TO RELATED APPLICATIONS AND PRIORITY CLAIMS

The present application is a continuation application of parent PCT Application No.: PCT/JP2011/001551, which was published under PCT Article 21(2) in Japanese, which was filed Mar. 16, 2011, which claims priority from Japanese Patent Application No. 2010-079797, which was filed Mar. 30, 2010, the contents of all of which are incorporated by reference herein in their entirety.

TECHNICAL FIELD

The present invention relates to a coupling structure between a front pillar and a side sill of an automobile, which is formed by coupling the lower end portion of the front pillar extended in the up-down direction of the automobile to the front end portion of the side sill extended in the front-rear direction of the automobile.

BACKGROUND ART

Conventionally, a coupling structure between a front pillar and a side sill of an automobile has been formed by coupling the lower end portion of the front pillar, which is extended in the up-down direction of the automobile and formed into a shape having a closed cross-section by fitting together a front pillar outer and a front pillar inner, to the front end portion of the side sill, which is extended in the front-rear direction of the automobile and likewise formed into a shape having a closed cross-section.

Aside from this, in recent efforts to further reduce the weight of automobiles, particularly, the front pillar outer is made from steel sheet, which is a material with a high strength.

However, in order to enable the lower end portion of the front pillar to be coupled to the side sill, the front pillar is formed into a bent structure, which is largely bent out from the up-down direction of the automobile toward the rear side of the automobile by drawing a long curve.

Therefore, use of high-strength steel sheet as the material of the front pillar outer makes it difficult to mold the front pillar outer into a predetermined shape by one pressing, which leads to a drop of the productivity.

Hence, conventionally, in order to make the structure of the front pillar as simple as possible to improve the productivity, simplification of the structure has been attempted by forming the front pillar into a three-piece structure, which includes from the top of the automobile downward, an upper portion, a center portion joined to the lower end of the upper portion, and a lower portion joined to the lower end of the center portion, which are joined together at their ends, while at the same time, efforts have been made to form the lower end structure of the lower portion into as short a shape as possible (see Patent Document 1 and Patent Document 2).

Patent Document 1: Japanese Patent Application Publication No. 2008-222039
Patent Document 2: Japanese Patent Application Publication No. 2009-61991

DISCLOSURE OF THE INVENTION

Problems to be Solved by the Invention

As a result, the productivity of automobiles might drop due to increase in the number of molding dies and increase in the number of coupling points at which portions are coupled by spot welding, etc., which are due to the three-piece structure of the front pillar including the upper portion, the center portion, and the lower portion, and at the same time, the torsional rigidity of the automobile might deteriorate at the coupling portion between the lower portion and the side sill due to the short shape of the lower end structure of the lower portion.

Here, a torsion of an automobile is a phenomenon in which the front portion and the rear portion of the automobile are relatively twisted about the front-rear direction axis of the automobile. In order to suppress such a torsion of an automobile, it is necessary to improve the torsional rigidity of the automobile.

If such a torsion occurs at the coupling portion between the front pillar and the side sill, the torsional rigidity of the automobile between the lower portion and the side sill is reduced because the front pillar is formed into a three-piece structure and the lower end structure of the lower portion of the front pillar is formed into a short shape as in the above conventional technique.

If the torsional rigidity of the automobile lowers, for example, yawing the automobile by handling the steering wheel might not result in the driver's intended yawing of the automobile, which falls behind in responding to the yawing steering to cause rolling, etc. thereby fluctuating the steering direction and spoiling the steering stability. The steering stability needs to be higher as the automobile is a more high-end one.

In order to secure steering stability of an automobile, it is necessary to improve the torsional rigidity of the front pillar itself and that at the coupling portion between the front pillar and the side sill. The torsional rigidity includes three types, i.e., rigidity about the left-right direction axis (X axis) of the automobile, rigidity about the front-rear direction axis (Y axis) of the automobile, and rigidity about the up-down direction axis (Z axis) of the automobile, based on all of which it is necessary to evaluate the steering stability of the automobile.

It has been found out that the rigidity about the X axis and the rigidity about the Z axis are largely affected by a deformation at the bent portion of the coupling portion between the front pillar and the side sill, particularly, at X-axis plane flanges coupling the sill inner and the sill outer (note that "an X-axis plane" refers to a plane crossing the X-axis direction, which is the left-right direction of the automobile).

In view of this point, it is conceivable to take in the above conventional technique, a measure of increasing the coupling strength between the front pillar and the side sill by drawing out the lower end portion of the lower portion of the front pillar.

However, such a measure adversely results in making it more difficult to mold the front pillar, particularly, the front pillar outer.

Hence, it is desirable to cut the lower end portion of the lower portion of the front pillar as short as possible, which however results in reduction of the rigidity about the X axis and the Z axis.

According to the experiments conducted by the inventors, it is proved that when the lower end portion of the lower portion is cut short as done conventionally, the rigidity about the X axis and the Z axis is reduced by 2 to 5% from when the lower end portion is not cut short.

The rigidity about the Y axis is affected by a torsional moment that occurs at the coupling portion between the front pillar and the side sill. In order to improve the rigidity at the coupling portion subject to such a torsional moment, the structure shown in FIG. 8 and FIG. 9 has been employed conventionally.

Figure 8:
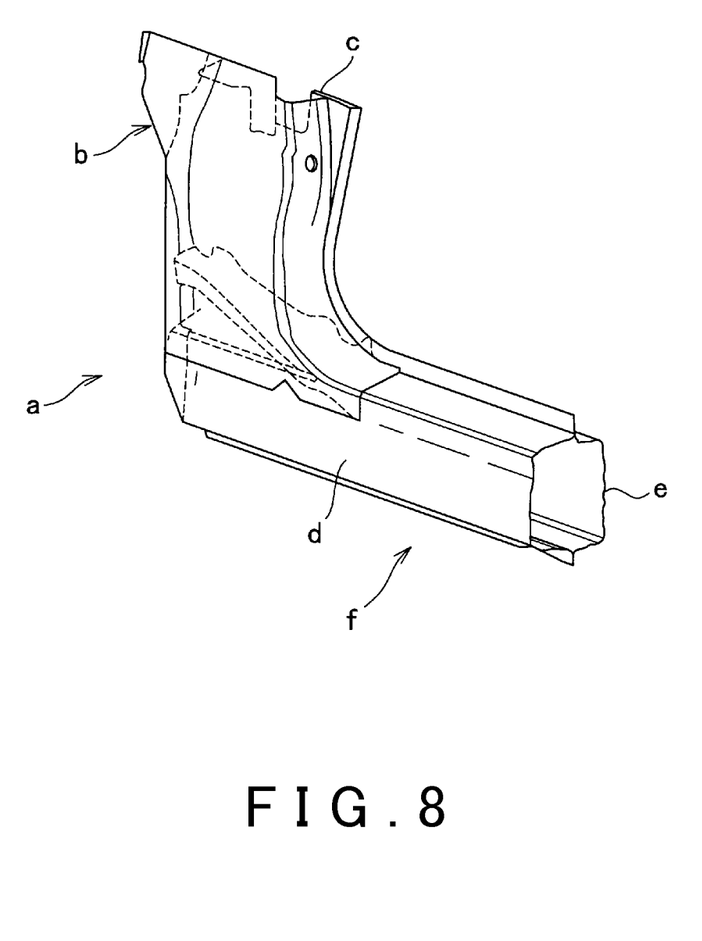
FIG. 8 is a perspective diagram showing a portion of a front pillar and a side sill according to a conventional technique, as seen from the front pillar outer side.
Figure 9:
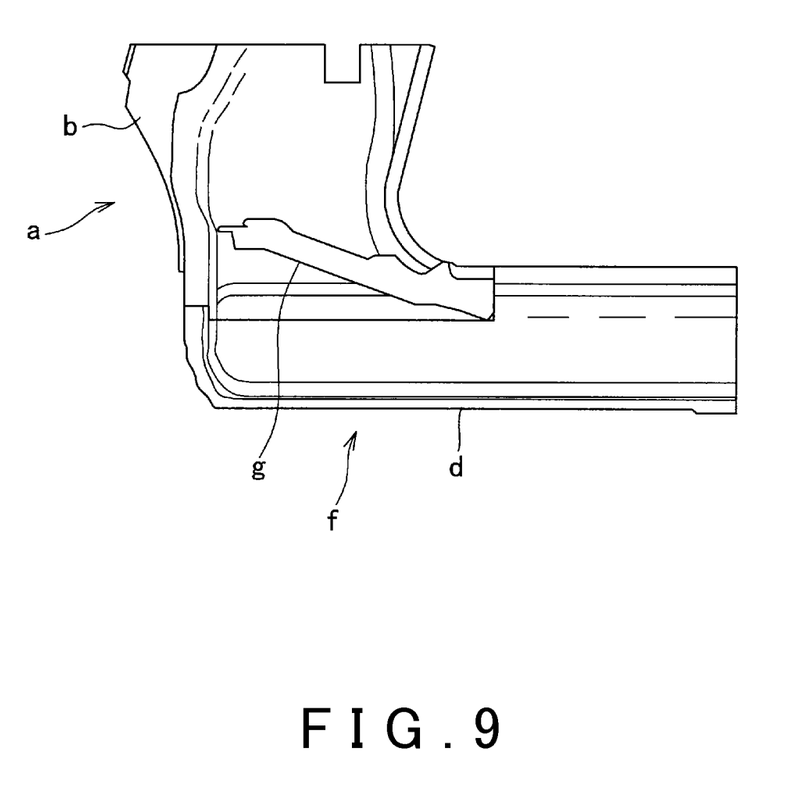
FIG. 9 is a side elevation showing the coupling portion between the front pillar and the side sill shown in FIG. 8, by removing the front pillar inner forming the front pillar and the side sill inner forming the side sill.

That is, a front pillar a to be extended in the up-down direction of the automobile is formed into a shape having a closed cross-section by fitting together a front pillar outer b, which has a hat-shaped cross-section, and a front pillar inner c, a large part of which is flat. The lower end portion of the front pillar a is bent toward the rear direction of the automobile, which enables the front pillar a to be coupled to the front end portion of a side sill f, which is formed into a shape having a closed cross-section by fitting together a side sill outer d and a side sill inner e such that they are extended in the front-rear direction of the automobile.

In the conventional coupling structure between the front pillar and the side sill, in order to improve the strength of the automobile against an input that is given upon a head-on crash mainly by a tire (not shown) giving an impact on the front pillar a, a reinforcing member g is provided inside the shape having the closed cross-section formed by the front pillar outer b and the front pillar inner c, such that the reinforcing member g is slanted downward toward the rear direction of the automobile. The reinforcing member g is coupled to the front pillar outer b and the front pillar inner c by, for example, spot welding.

However, since the reinforcing member g is intended to suppress deformation of the cross-sectional shape of the front pillar a against an input that is given in the front-rear direction of the automobile mainly upon a head-on crash and to efficiently transmit the collision load to the side sill f, the reinforcing member g is still not enough to increase the rigidity against a torsional moment at the coupling portion between the front pillar a and the side sill f.

Figure 10:
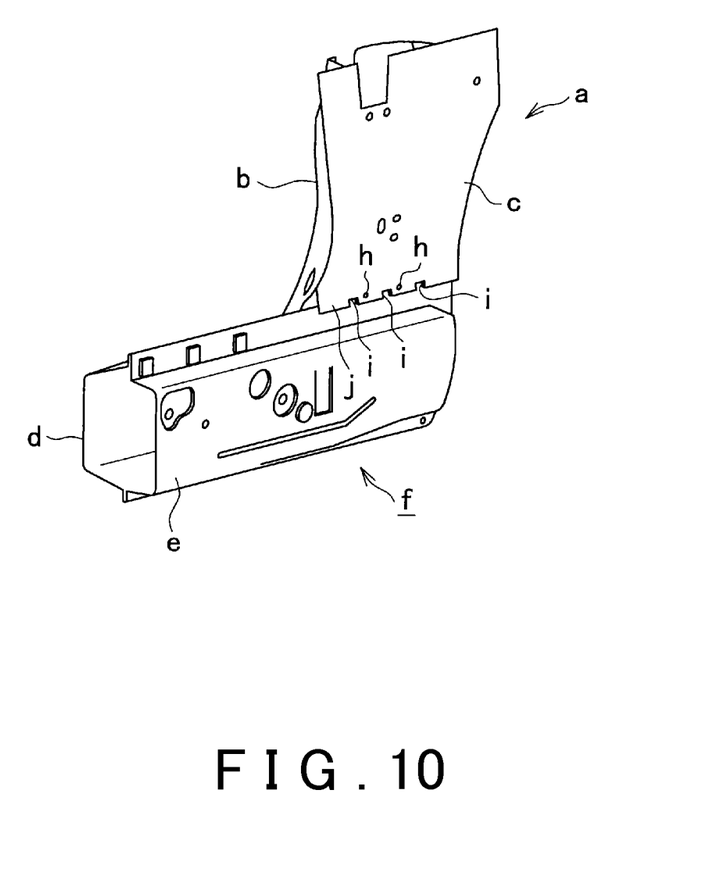
FIG. 10 is a perspective diagram showing a portion of the front pillar and the side sill according to the conventional technique, as seen from the front pillar inner side.
Figure 11:
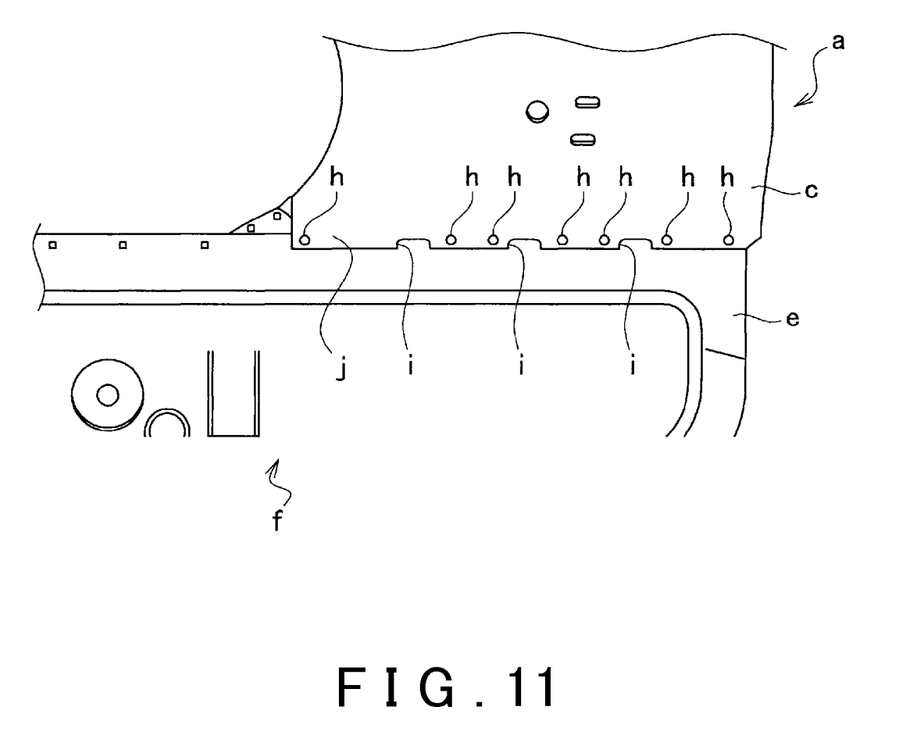
FIG. 11 is a side elevation showing the coupling portion between the front pillar and the side sill shown in FIG. 10, as seen from the front pillar inner side.

Further, in the conventional technique, as shown in FIG. 10 and FIG. 11, the lower end portion of the front pillar inner c is coupled, by, for example, a line of coupling points h arranged along the front-rear direction of the automobile, to the side sill outer d which forms the side sill f having a closed cross-section together with the side sill inner e. In order to enable the side sill inner e and the side sill outer d to be coupled together at their flanges by spot welding, etc., a plurality of cutouts i, which are opened at the bottom, are formed in the lower end portion of the front pillar inner c, so as to correspond to the coupling points h.

Hence, it has been found out experimentally that the rigidity of the coupling portion between the front pillar a and the side sill f, especially about the Y axis, is not high enough, since in the conventional coupling structure between the front pillar and the side sill, the front pillar inner c is coupled at its lower end portion to the side sill outer d of the side sill f only by the line of coupling points h arranged in the front-rear direction of the automobile.

Therefore, it is an object of an aspect of the innovations herein to provide a coupling structure between a front pillar and a side sill of an automobile, which improves the steering stability of the automobile and at the same time realizes a high productivity.

Means for Solving the Problems

A coupling structure between a front pillar and a side sill of an automobile according to the present invention is a coupling structure between the front pillar and the side sill of the automobile formed by coupling the lower end portion of the front pillar which is extended in the up-down direction of the automobile and formed into a shape having a closed cross-section by fitting together a front pillar outer and a front pillar inner, to the front end portion of the side sill extended in the front-rear direction of the automobile. A reinforcing member is provided inside the front pillar having the closed cross-section so as to extend in the front-rear direction of the automobile and is coupled to the front pillar. An end portion of the reinforcing member at the rear side of the automobile is extended toward the side sill to form a reinforcing member extension, and the reinforcing member extension is coupled to the side sill.

In the present invention having the above structure, the reinforcing member provided inside the front pillar having the closed cross-section so as to extend in the front-rear direction of the automobile is coupled to the front pillar, and the reinforcing member extension formed by extending the end portion of the reinforcing member at the rear side of the automobile toward the side sill is coupled to the side sill, which allows the torsional rigidity of the front pillar about the X axis and Z axis of the automobile to be increased by the rigidity of the reinforcing member to enable the steering stability of the automobile to be improved even if the front pillar outer forming the front pillar together with the front pillar inner is cut short. At the same time, the front pillar may have not the conventional three-piece structure but a single-piece structure, which realizes a high productivity.

In the above embodiment of the invention, the present invention may provide that the reinforcing member is coupled to the front pillar outer.

This structure allows the lower end portion of the front pillar outer to be cut short without sacrificing the steering stability of the automobile, allowing for providing a highly-productive coupling structure between a front pillar and a side sill of an automobile. Moreover, it is possible to achieve reduction of the weight by making the front pillar outer, which is made of a material having a high strength, into a thin wall.

In the above embodiment of the invention, the present invention may provide that the lower end portion of the front pillar inner is extended toward the side sill to form a front pillar inner extension, the lower end portion of the front pillar inner is coupled to a side sill inner of the side sill, and the front pillar inner extension is coupled to the side sill inner.

This structure, in which the lower end portion of the front pillar inner is coupled to the side sill inner of the side sill and the front pillar inner extension is coupled to the side sill inner, enables the coupling rigidity between the front pillar inner and the side sill inner to be increased, enabling the rigidity of the coupling portion between the front pillar inner and the side sill inner, especially about the Y axis of the automobile, to be increased. Moreover, the front pillar inner is made of a material that is not so strong as the material of the front pillar outer and has a substantially-flat simple shape, which prevents molding from becoming difficult even if the front pillar inner extension is provided.

In the above embodiment of the invention, the present invention may provide that a coupling point at which the lower end portion of the front pillar inner and the side sill inner are coupled and a coupling point at which the front pillar inner extension and the side sill inner are coupled are arranged as staggered from each other.

This structure, in which the coupling point spotted for coupling the lower end portion of the front pillar inner and the side sill inner and the coupling point spotted for coupling the front pillar inner extension and the side sill inner are provided in a staggered arrangement, enables the coupling rigidity between the front pillar inner and the side sill inner to be increased, enabling the rigidity of the coupling portion between the front pillar inner and the side sill inner, especially about the Y axis of the automobile, to be increased. Moreover, the front pillar inner is made of a material that is not so strong as the material of the front pillar outer and has a simple shape, a relatively large part of which is flat, which prevents molding from becoming difficult eve if the front pillar inner extension is provided.

In the above embodiment of the invention, the present invention may provide that the side sill inner forming the side sill is extended toward the front pillar inner to form a side sill extension, the side sill inner is coupled to the front pillar inner, and the side sill extension is coupled to the front pillar inner.

The present invention, which has the above structure in which the lower end portion of the front pillar inner is coupled to the side sill inner of the side sill and the side sill extension is coupled to the front pillar inner, can increase the coupling rigidity between the side sill inner and the front pillar inner, enabling the rigidity of the coupling portion between the side sill inner and the front pillar inner, especially about the Y axis of the automobile, to be increased.

In the above embodiment of the invention, the present invention may provide that the coupling point at which the lower end portion of the front pillar inner and the side sill inner are coupled and the coupling point at which a side sill inner extension and the front pillar inner are coupled are arranged as staggered from each other.

The present invention, which has the above structure in which the coupling point spotted for coupling the side sill inner and the lower end portion of the front pillar inner and the coupling point spotted for coupling the side sill extension and the front pillar inner are arranged as staggered from each other, can increase the coupling rigidity between the side sill inner and the front pillar inner, enabling the rigidity of the coupling portion between the front pillar inner and the side sill inner, especially about the Y axis of the automobile, to be increased.

Effect of the Invention

According to the present invention described above, the reinforcing member provided inside the front pillar having the closed cross-section so as to extend in the front-rear direction of the automobile is coupled to the front pillar, and the reinforcing member extension formed by extending the end portion of the reinforcing member at the rear side of the automobile toward the side sill is coupled to the side sill, which allows the torsional rigidity of the front pillar about the X axis and Z axis of the automobile to be increased by the rigidity of the reinforcing member to enable the steering stability of the automobile to be improved even if the front pillar outer forming the front pillar together with the front pillar inner is cut short. At the same time, the front pillar may have not the conventional three-piece structure but a single-piece structure, which realizes a high productivity.

BEST MODE FOR CARRYING OUT THE INVENTION

Figure 1:
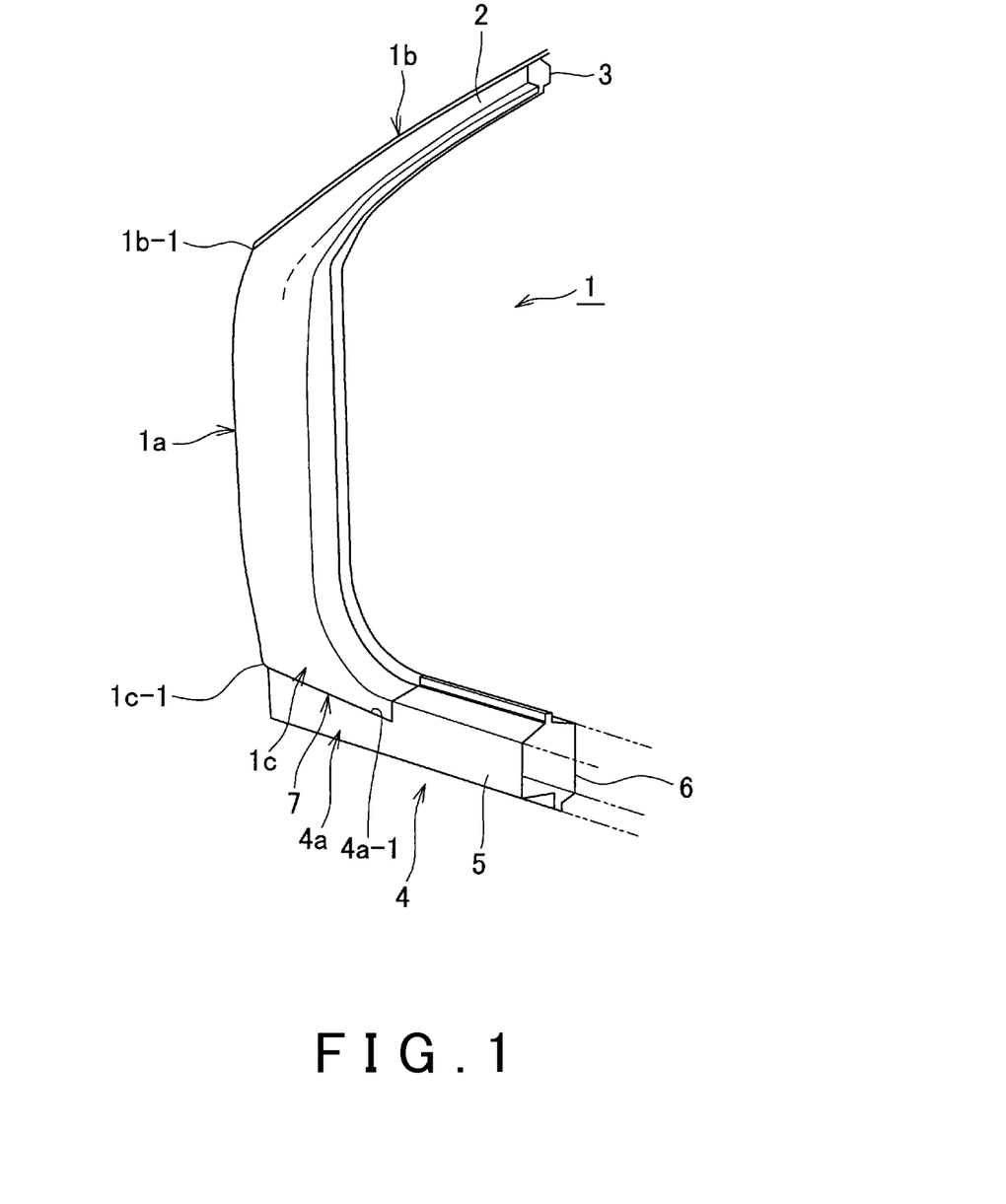
FIG. 1 is a perspective diagram showing a coupled state between a front pillar and a front end portion of a side sill, to which one embodiment of the present invention is applied.

As shown in FIG. 1, a front pillar 1 according to one embodiment of the present invention is extended in the up-down direction of an automobile, and formed into a shape having a closed cross-section by coupling a front pillar outer 2 made of a material such as steel sheet having a high strength and having a hat-shaped cross-section and a front pillar inner 3 made of a material such as steel sheet of which strength is not very high and formed to be flat over a relatively wide area thereof, at their edge flanges.

The front pillar 1 has a center portion 1*a* at its center, from which its upper portion 1*b* and its lower portion 1*c* extend to the rear direction of the automobile by having a bent portion 1*b*-1 and a bent portion 1*c*-1. The front pillar outer 2 and the front pillar inner 3 both have a single-piece structure molded by, for example, press molding, etc.

The front pillar 1 is structured such that the lower portion 1*c* is coupled to a front end portion 4*a* of a side sill 4 by, for example, spot welding, etc. with the lower portion 1*c*, which is opened downward, fitted over an upwardly-opened opening portion 4*a*-1 located at the front end portion 4*a* of the side sill 4.

The side sill 4 is formed into a shape having a closed cross-section by coupling a side sill outer 5 having a hat-shaped cross-section and positioned at the outer side of the automobile and a side sill inner 6 having a hat-shaped cross-section and positioned at the inner side of the automobile, at their flanges by spot welding, etc.

Figure 2:
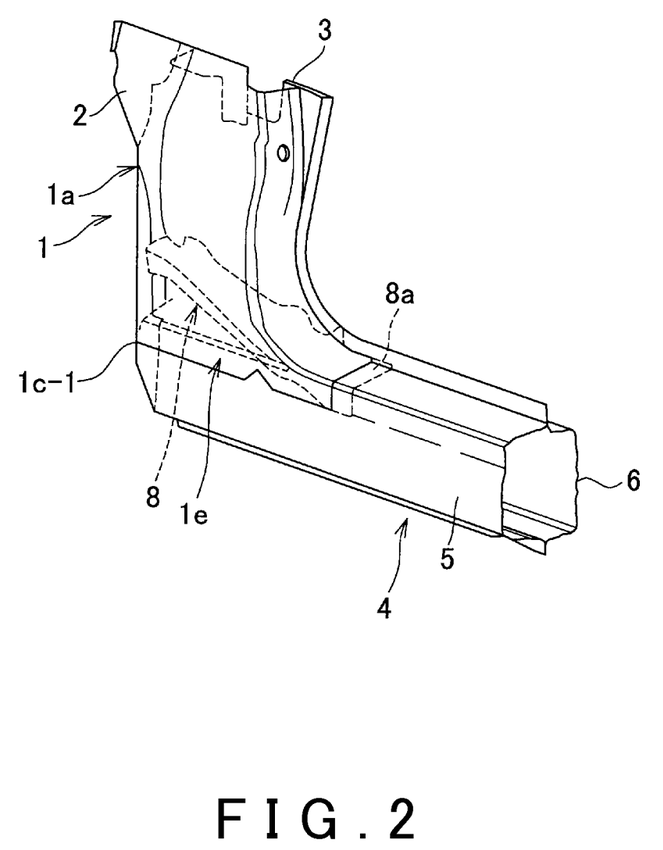
FIG. 2 is a perspective diagram showing an enlarged state of the coupling portion between the front pillar and the side sill shown in FIG. 1.
Figure 3:
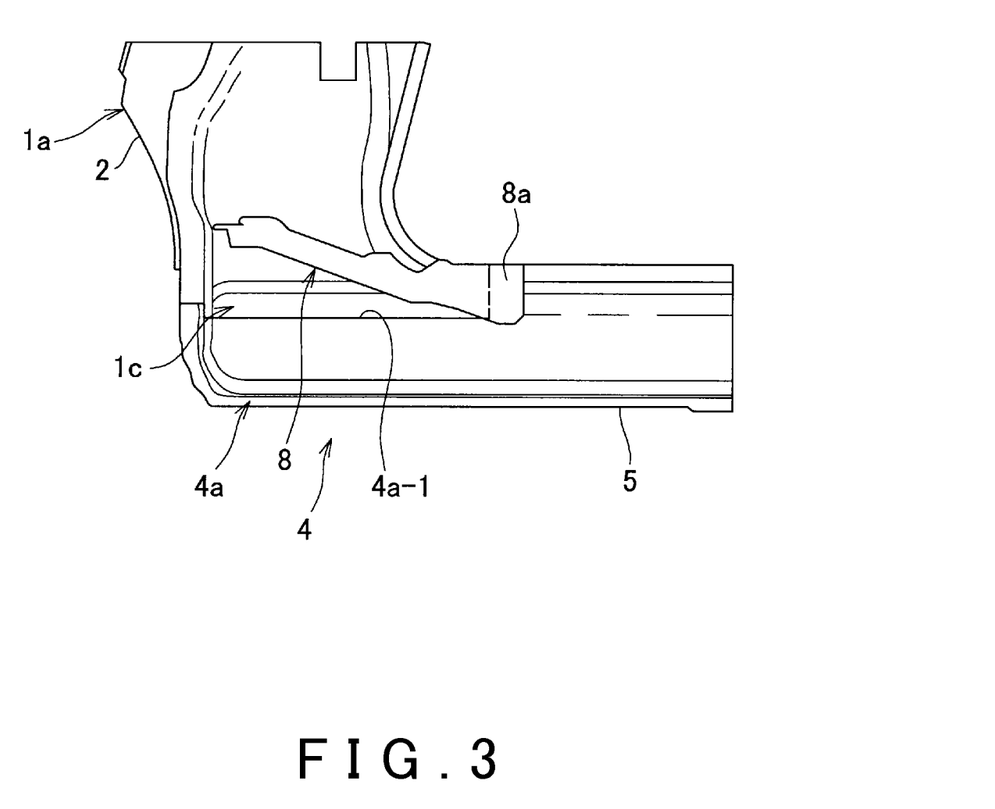
FIG. 3 is a side elevation likewise showing the coupling portion between the front pillar and the side sill shown in FIG. 1, by removing a front pillar inner forming the front pillar and a side sill inner forming the side sill.

A plate-shaped reinforcing member 8 having an approximately "Z"-shaped cross-section as shown in FIG. 2 and FIG. 3 is provided at a coupling portion 7 coupling with the side sill 4 inside the shape having the closed cross-section formed by the front pillar outer 2 and the front pillar inner 3.

The reinforcing member 8 is provided inside the shape having the closed cross-section formed by the front pillar outer 2 and the front pillar inner 3 such that it is slanted downward toward the rear end of the automobile, is coupled with the front pillar outer 2 by spot welding, etc., and has a reinforcing member extension 8a formed integrally therewith with its end portion at the rear side of the automobile extended toward the side sill 4.

Figure 4:
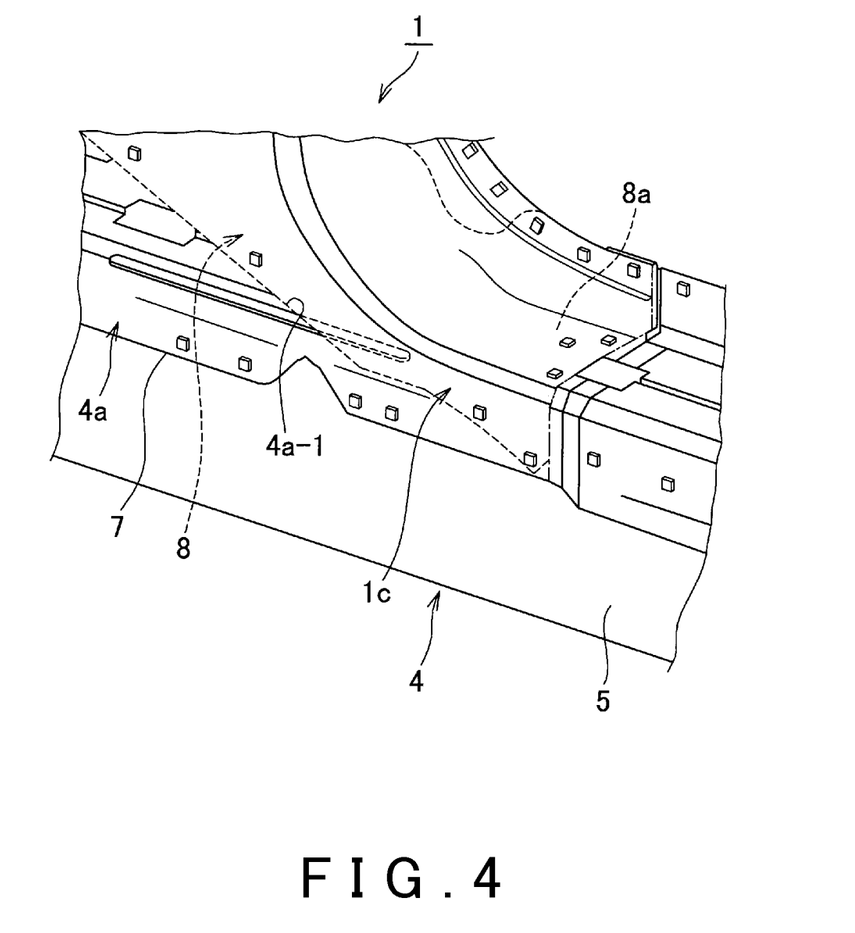
FIG. 4 is a perspective diagram of an essential portion, likewise showing the coupling portion between the front pillar and the side sill shown in FIG. 1, by removing the front pillar inner forming the front pillar and the side sill inner forming the side sill.

As clearly shown in FIG. 4, the reinforcing member extension 8a is coupled by spot welding, etc to X-axis plane coupling flanges of both the side sill outer 5 and the side sill inner 6 forming the side sill 4 and to the side sill outer 5 itself.

In the embodiment of the present invention configured as described above, the reinforcing member 8 provided inside the front pillar 1 having the closed-cross section so as to extend in the front-rear direction of the automobile is coupled to the front pillar outer 2 of the front pillar 1 and the reinforcing member extension 8a formed by extending the end portion of the reinforcing member at the rear side of the automobile toward the side sill 4 is coupled to the side sill outer 5 of the side sill 4, which allows the torsional rigidity of the front pillar 1 about the X axis and Z axis of the automobile to be increased by the rigidity of the reinforcing member 8 to enable the steering stability of the automobile to be improved even if the lower end portion of the front pillar outer 2 forming the front pillar 1 together with the front pillar inner 3 is cut short. At the same time, the front pillar 1 having a single-piece structure but not the conventional three-piece structure allows itself to be molded at a time with only one molding die, which realizes a high productivity.

Figure 5:
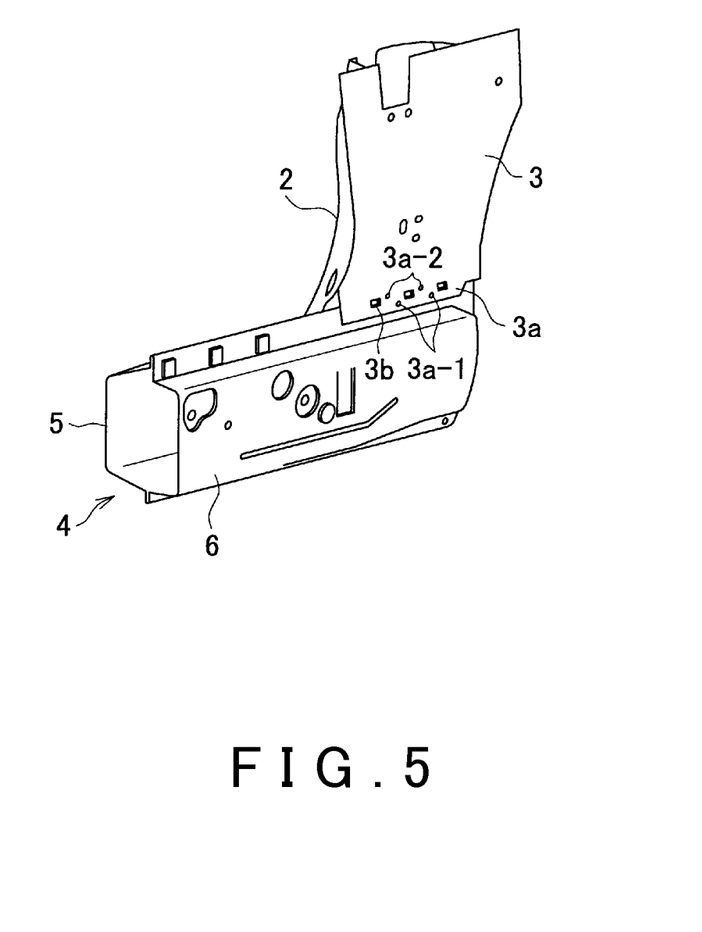
FIG. 5 is a perspective diagram of the coupling portion between the front pillar and the side sill and therearound, showing a modified example of the embodiment of the coupling structure between a front inner panel and the side sill inner shown in FIG. 1.
Figure 6:
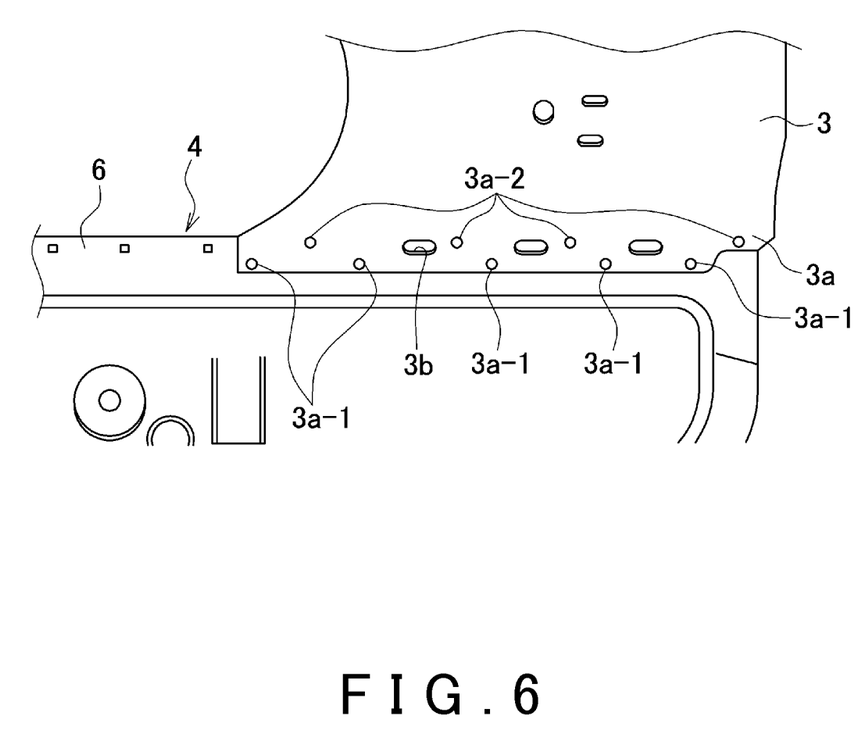
FIG. 6 is a side elevation showing an enlarged state of the coupling portion between the front pillar inner and the side sill inner shown in FIG. 5.

FIG. 5 and FIG. 6 show a modified example of the above embodiment of the present invention.

According to FIG. 5 and FIG. 6, the lower end portion of the front pillar inner 3 is extended toward the side sill 4 to form a front pillar inner extension 3a, which is the difference from the above embodiment. The front pillar inner extension 3a is coupled to the side sill inner 6 by spot welding, etc.

As clearly shown in FIG. 6, there are two coupling points 3a-1, at which the front pillar inner extension 3a is coupled to the side sill inner 6, which are provided in line along the front-rear direction of the automobile as spaced apart from each other. The coupling points 3a-1 are arranged as staggered from two spaced-apart coupling points 3a-2, at which the lower end portion of the front pillar inner 3 is coupled to the side sill inner 6.

Through-holes 3b are formed in the lower end portion of the front pillar inner 3 in order to enable the side sill outer 5 and the side sill inner 6 to be coupled together directly by spot welding, etc.

According to the structure of the modified example of the present invention, the staggered arrangement between the coupling points 3a-2 at which the lower end portion of the front pillar inner 3 is coupled to the side sill inner 6 and the coupling points 3a-1 at which the front pillar inner extension 3a is coupled to the side sill inner 6 enables the coupling rigidity between the front pillar inner 3 and the side sill inner 6 to be increased, enabling the rigidity of the coupling portion between the front pillar inner 3 and the side sill inner 6, especially about the Y axis of the automobile, to be increased. Moreover, the front pillar inner 3 is made of a material that is not as strong as the material of the front pillar outer and has a simple shape most of which is flat, which prevents molding from becoming difficult even if the front pillar inner extension 3a is provided.

Figure 7:
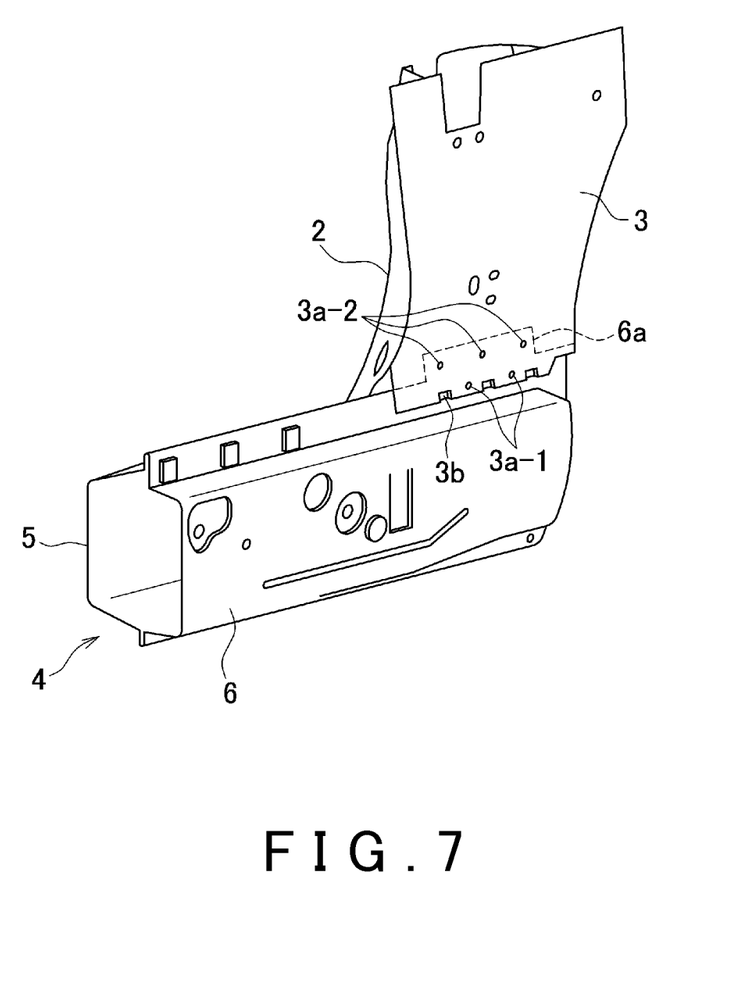
FIG. 7 is a perspective diagram of the coupling portion between the front pillar and the side sill and therearound, showing another modified example of the embodiment of the coupling structure between the front inner panel and the side sill inner shown in FIG. 1.

According to another modified example of the embodiment of the present invention, instead of forming the front pillar inner extension 3a at the lower end portion of the front pillar inner 3, it is possible to extend the upper end portion of the side sill inner toward the front pillar inner 3 to form a side sill extension 6a and couple the side sill extension 6a to the front pillar inner 3, as shown in FIG. 7.

This structure of the present invention, in which the lower end portion of the front pillar inner 3 is coupled to the side sill inner 6 and the side sill extension is coupled to the front pillar inner 3, enables the coupling rigidity between the side sill inner 6 and the front pillar inner 3 to be increased, enabling the rigidity of the coupling portion between the side sill inner 6 and the front pillar inner 3, especially about the Y axis of the automobile, to be increased.

According to this another modified example, the coupling points at which the lower end portion of the front pillar inner 3 is coupled to the side sill inner 6 and the coupling points at which a side sill inner extension is coupled to the front pillar inner 3 are likewise provided in a staggered arrangement, which enables the coupling rigidity between the side sill inner 6 and the front pillar inner 3 to be increased, enabling the rigidity of the coupling portion between the front pillar inner 3 and the side sill inner 6, especially about the Y axis of the automobile, to be increased.

INDUSTRIAL APPLICABILITY

As explained above, in the present invention, the reinforcing member provided inside the front pillar having a closed cross-section so as to extend in the front-rear direction of the automobile is coupled to the front pillar and the reinforcing member extension formed by extending the end portion of the reinforcing member at the rear side of the automobile toward the side sill is coupled to the side sill, which allows the torsional regidities of the front pillar about the X axis and Z axis of the automobile to be increased by the rigidity of the reinforcing member to enable the steering stability of the automobile to be improved even if the front pillar outer forming the front pillar together with the front pillar inner is formed cut-short. At the same time, the front pillar may have not the conventional three-piece structure but a single-piece structure, which allows for realizing a high productivity and is hence suitable for the coupling structure between the front pillar and side sill of an automobile, which is formed by coupling the lower end portion of the front pillar extended in the up-down direction of the automobile to the front end portion of the side sill extended in the front-rear direction of the automobile.

DESCRIPTION OF REFERENCE NUMERALS 1 front pillar
2 front pillar outer
3 front pillar inner
3a front panel inner extension
3a-1, 3a-2 coupling point
4 side sill
5 side sill outer
6 side sill inner
7 coupling portion
8 reinforcing member
8a reinforcing member extension

The invention claimed is:
1. A coupling structure between a front pillar and a side sill of an automobile formed by coupling a lower end portion of the front pillar to a front end portion of the side sill, the front pillar being extended in an up-down direction of the automobile and formed into a shape having a closed cross-section by fitting together a front pillar outer and a front pillar inner, the side sill being extended in a front-rear direction of the automobile, wherein a reinforcing member is provided inside the front pillar having the closed-cross section so as to extend in the front-rear direction of the automobile and is coupled to the front pillar, an end portion of the reinforcing member at a rear side of the automobile is extended toward the side sill to form a reinforcing member extension, and the reinforcing member extension is coupled to the side sill.

2. The coupling structure between the front pillar and the side sill of the automobile according to claim 1, wherein the reinforcing member is coupled to the front pillar outer.

3. The coupling structure between the front pillar and the side sill of the automobile according to claim 1, wherein a lower end portion of the front pillar inner is extended toward the side sill to form a front pillar inner extension, the lower end portion of the front pillar inner is coupled to a side sill inner of the side sill, and the front pillar inner extension is coupled to the side sill inner.

4. The coupling structure between the front pillar and the side sill of the automobile according to claim 3, wherein a coupling point at which the lower end portion of the front pillar inner and the side sill inner are coupled and a coupling point at which the front pillar inner extension and the side sill inner are coupled are arranged as staggered from each other.

5. The coupling structure between the front pillar and the side sill of the automobile according to claim 1, wherein a side sill inner forming the side sill is extended toward the front pillar inner to form a side sill inner extension, the side sill inner is coupled to the front pillar inner, and the side sill inner extension is coupled to the front pillar inner.

6. The coupling structure between the front pillar and the side sill of the automobile according to claim 5, wherein a coupling point at which the lower end portion of the front pillar inner and the side sill inner are coupled and a coupling point at which the side sill inner extension and the front pillar inner are coupled are arranged as staggered from each other.

7. The coupling structure between the front pillar and the side sill of the automobile according to claim 1, wherein the reinforcing member is provided so as to be slanted downward toward a rear end of the automobile.

8. The coupling structure between the front pillar and the side sill of the automobile according to claim 1, wherein the reinforcing member has an approximately Z-shaped cross-section.

* * * * *